May 21, 1946.  W. E. MOREY ET AL  2,400,705
RECLINING SEAT
Original Filed Nov. 18, 1939   3 Sheets-Sheet 2
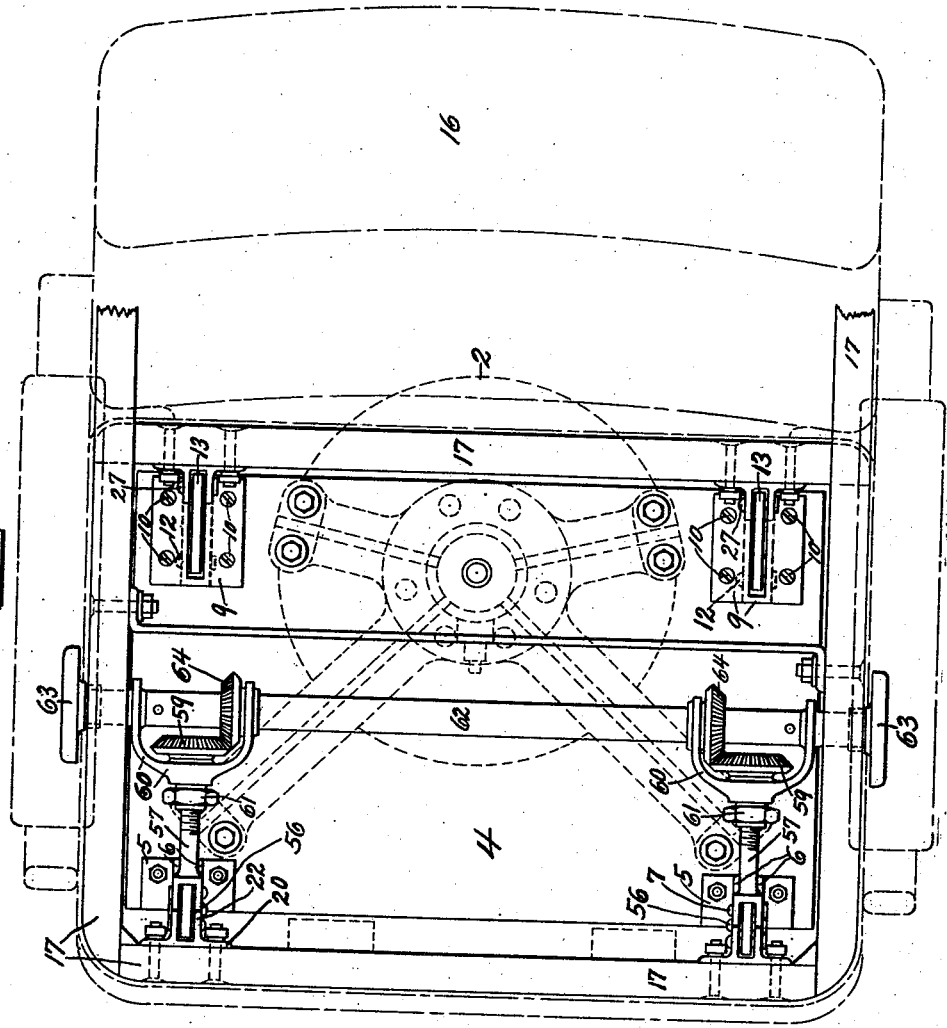
INVENTORS
William E. Morey
Ralph G. Nichols
BY  ATTORNEY

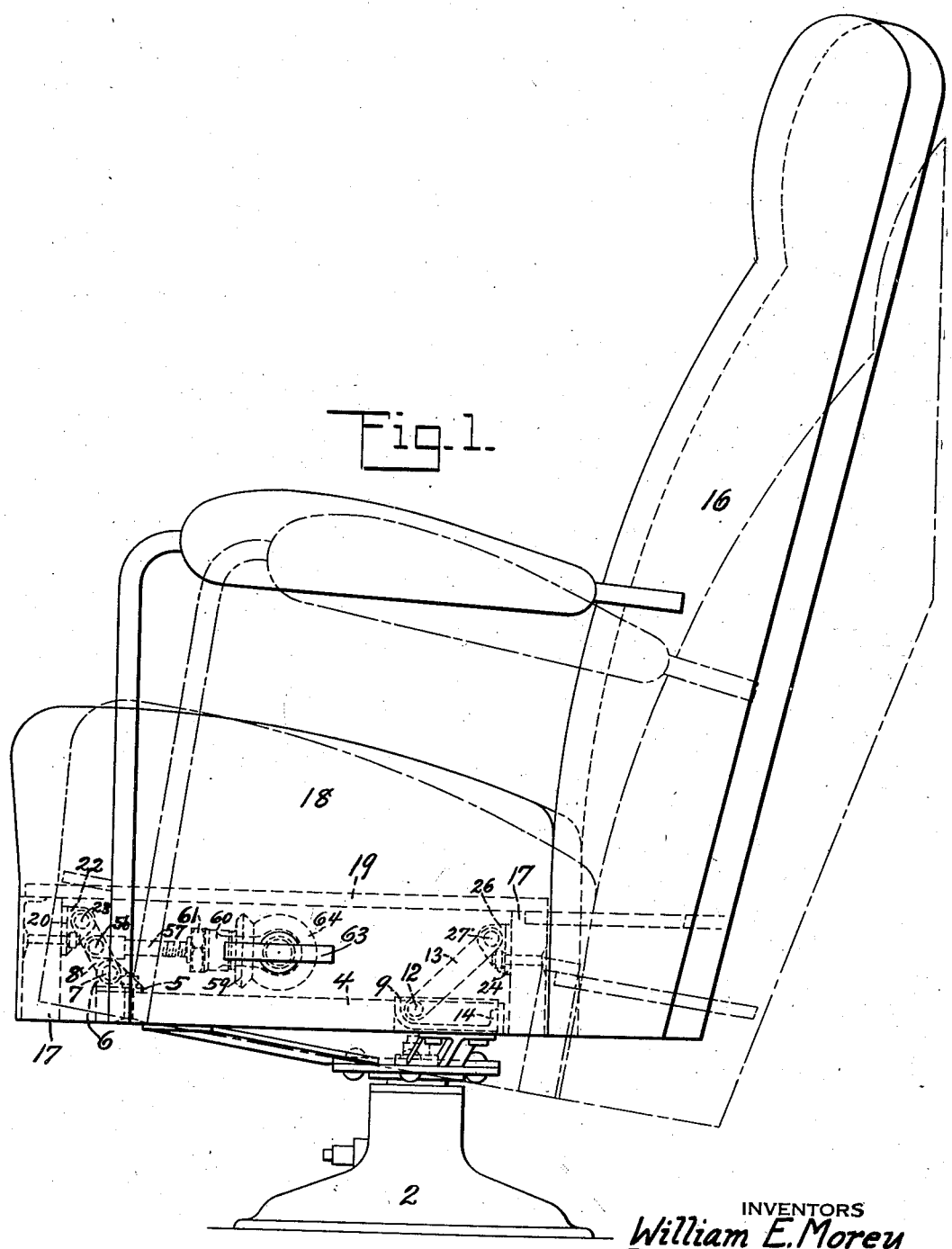

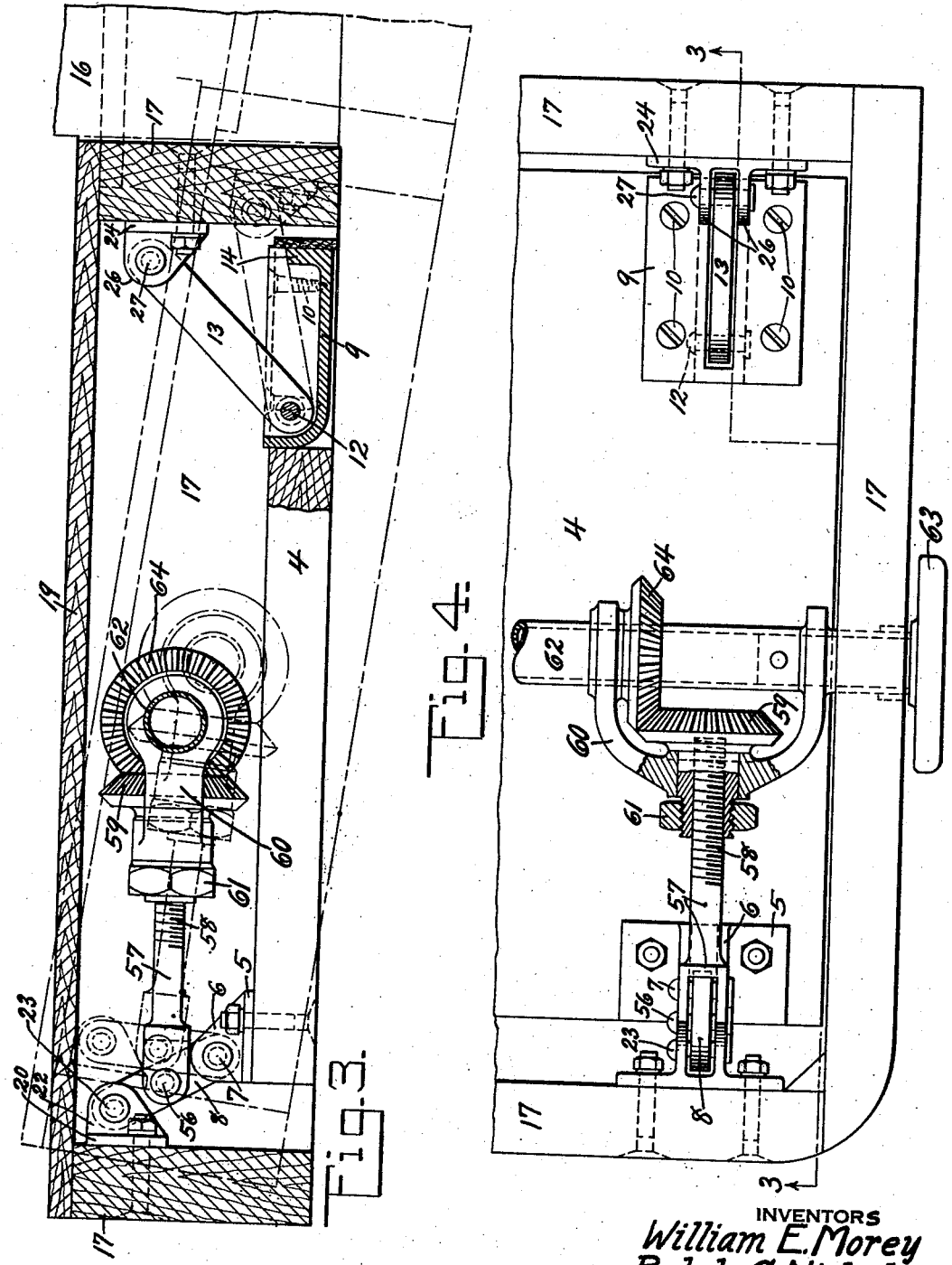

Patented May 21, 1946

2,400,705

UNITED STATES PATENT OFFICE 2,400,705

RECLINING SEAT

William E. Morey, Huntington, W. Va., and Ralph G. Nichols, Weldon Spring, Mo., assignors to American Car and Foundry Company, New York, N. Y., a corporation of New Jersey Original application November 18, 1939, Serial No. 305,054. Divided and this application December 15, 1942, Serial No. 469,053

.5 Claims. (Cl. 155—90)

This invention relates to reclining seats in general and in particular to such seats for use in road or rail vehicles wherein the seat back and cushion move in unison to a reclining position, and is a division of our application for Reclining seat, Serial No. 305,054 filed November 18, 1939, and now Patent 2,319,743, granted May 18, 1943.

The majority of reclining seats now in use have the back portion movable relative to the cushion with the result that a person can only be in the most comfortable position at one point of seat back adjustment. As the seat back is inclined the angular relation between the passenger's legs and back varies and may vary to such a degree as to be very tiring to the passenger. The major reason for such discomfort to the passenger is due to the fact that in a number of the inclined positions the lower portion of the spine is not properly supported, this being due to the change in angular relation between the seat back and cushion. It has been proven by experiement that the greatest comfort is obtained when the seat back and cushion have a constant angular relationship, with the enclosed angle being approximately 90 degrees. It is an object, therefore, of the present invention to provide a reclining seat in which the seat back and the cushion are at a constant angular relation to each other.

A further object of the invention is the provision of a reclining seat in which the rear portion of the cushion lowers as the seat back assumes a more reclining position.

A still further object of the invention is the provision of a seat having the back and cushion rockably supported upon the seat base by means of links.

A yet further object of the invention is the provision of a reclining seat the motion of which may be accurately controlled by an extremely simple operating mechanism.

These and other objects of the invention will be apparent to persons skilled in the art from a study of the following description and accompanying drawings, in which:

Figure 1 is an end elevational view of the improved seat and disclosing the seat by full lines in normal position and by line and dash in the fully tilted or reclining position;

Fig. 2 is a plan view of the seat supporting and reclining mechanism;

Fig. 3 is a sectional view taken substantially on line 3—3 of Fig. 4, and

Fig. 4 is an enlarged partial plan view of the operating mechanism with parts broken away to better disclose the construction.

Referring now to the drawings in detail, it will be seen that the seat is revolvably supported upon a pedestal 2 by means of a seat base 4 which may revolve only in a substantially horizontal plane. The seat base may be made of any desired material but in the present instance is shown as constructed of wood, carrying adjacent its front corners lugs 5 formed with upstanding ears 6, across which a pin 7 may extend and upon which is pivotally mounted the lower ends of front supporting links 8. The base frame is also provided adjacent its rear corners with flanged U-shaped castings 9 secured to the base by any suitable means such as screws 10. Pins 12 extend across the sides of each flanged U-shaped casting and pivotally support the lower ends of rear supporting links 13 of such a length as to rest upon and extend outwardly beyond rear vertically extending flange 14 of the flanged U-shaped castings.

The seat portion proper consists of a seat back 16 preferably rigidly connected to a skeleton seat frame 17 upon which rests a cushion 18 preferably secured to cushion supporting board 19, which latter may be either permanently or removably secured to the skeleton seat frame. The front cross board of the skeleton seat frame has secured thereto adjacent its ends lugs 20 having outstanding ears 22 across which extend pins 23 rotatably supported upon the upper ends of front supporting links 8 previously referred to. The rear cross member of the skeleton seat frame has secured thereto adjacent its ends lugs 24 formed with outstanding ears 26 across which extend pins 27 rotatably supported upon the upper ends of rear supporting links 13 previously referred to. In this manner the seat back, skeleton seat frame and cushion are link supported at a plurality of points upon the rotatably mounted seat base. Attention is directed to the fact that if desired the relative lengths of the front and rear supporting links may be changed, in this way the normal inclination of the cushion supporting board and, therefore, the cushion surface may be controlled as can also the amount of angular movement permitted. Attention is also particularly directed to the fact that the front and rear supporting links are oppositely directed, thus certain of the forces acting on the links will tend to cancel each other and any mechanism controlling the position of the skeleton seat frame will need to control only the difference in forces acting upon the links.

As clearly shown in the drawings, the difference in forces acting upon the links is controlled by means of a mechanism carried by the skeleton seat frame and connected to certain of the frame supporting links. As shown the front support links are provided with a central opening through which a pin 56 may extend thereby forming a connection for the front end of a control rod or thrust rod 57, the rear end of which is formed with a screw thread 58 adapted to engage similar threads cut internally of the hub of a bevel gear 59. The hub of this bevel gear is rotatably mounted in the central portion of a U-shaped yoke 60 and is held in position by nut 61. The ends of the U-shaped yoke are rotatably supported upon a cross tubular shaft 62 which is in turn rotatably supported by the side members of the skeleton seat frame. This tubular shaft has rigidly connected thereto exterior of the frame an operating knob 63 and interiorly of the frame a bevel gear 64 adapted to mesh with the bevel gear 59. In this manner rotation of the operating knob will cause rotation of the bevel gears in unison and cause the thrust rod 57 to move in or out relative to the bevel gear 59 and thus in effect changing the distance between the axis of the shaft 62 and the pin 56. This change in distance will, of course, permit an angular motion between the frame and front supporting link 8 thereby positively controlling the tilting movements of the skeleton seat frame and its attached back and seat cushion.

It will be seen that the front supporting links 8 are inclined at a greater angle to the horizontal than are the rear supporting links and this is true whether the seat is in the normal or reclined position. Due to the different and changing angular relation existing between the supporting links, the horizontal components of the forces acting on the links will be of different magnitude and in opposite directions. The difference in these components must be absorbed by the thrust rods and their operating mechanism. That the thrust rods can absorb this thrust and hold the seat in any adjusted position is evident from the drawings for there can be no relative motion between the supporting links 8 and the seat frame unless the distance between pin 56 and axis of tubular shaft 62 is changed by rotation of the bevel gears. The provision of the bevel gears and screw threads 58 produces a power increasing arrangement permitting the operator to readily adjust the seat position in either direction between the normal and fully reclined position of the seat.

In operating the mechanism it is only necessary for the occupant of the seat to turn the operating knob 63 in the desired direction thus causing the tubular shaft and bevel gears to rotate. Rotation of the bevel gear 59 will cause the thrust link or control rod 57 to move in and out of the bevel gear under control of the threads 58.

While the mechanism has been described more or less in detail with specific reference to the drawings, it will be apparent to persons skilled in the art that various modifications and rearrangements of parts may be made and all such modifications and rearrangements of parts are contemplated as will fall within the scope of the appended claims defining our invention.

What is claimed is:

1. A reclining seat comprising in combination, a supporting structure, a seat base carried by said supporting structure, a seat frame having a cushion receiving portion, independent upwardly diverging links pivotally connected at their upper ends to said seat frame and at their lower ends to said seat base and supporting the front and rear sides of said frame upon said base for reclining movement of the frame, a shaft rotatably carried by said seat frame, gearing carried by said shaft, and thrust rods connected to the links supporting the front side of said seat frame and having threaded engagement with a part of said gearing to control the movement of the front links and thereby the reclining movements of said seat frame.

2. A reclining seat comprising in combination, a seat base carried by a supporting structure, a seat frame having a cushion receiving portion, a rear pair of upwardly and rearwardly inclined links pivotally supported at their lower ends on said base and pivotally connected at their upper ends to said seat frame, a front pair of upwardly and forwardly inclined shorter links connected at their lower ends to said seat base and at their upper ends to said seat frame, said pairs of links pivotally supporting said frame upon said base for reclining movement of the frame, a shaft rotatably carried by said seat frame, a pair of gears adjacent each end of said shaft, one gear of each pair fixed to said shaft, a thrust rod connected to each front link, and having a threaded end, one gear of a pair threaded on each thrust rod and meshing with the other gear of said pair, said gears being operable to change the angular position of the front pair of links when the shaft is turned whereby the reclining movements of said seat frame are positively controlled.

3. A reclining seat comprising in combination, a supporting structure, a seat base carried by said supporting structure, a seat frame having a cushion receiving portion, independent upwardly diverging links pivotally connected at their upper ends to said seat frame and at their lower ends to said seat base and supporting opposite sides of said frame upon said base for reclining movement of the frame, and means controlling the reclining movement of said seat frame and comprising, a thrust rod connected to one of said links, operating means carried by said seat frame and connected to said thrust rod to cause movement thereof.

4. A reclining seat comprising in combination, a supporting structure, a seat base carried by said supporting structure, a seat frame having a cushion receiving portion, independent diverging links pivotally connected at their upper ends to said seat frame and at their lower ends to said seat base and supporting each side of said frame upon said base for reclining movements of the frame, and means controlling the reclining movement of said seat frame and comprising, a thrust rod connected to one of said links, screw threads formed on said thrust rod, a gear driven screw nut engaging said screw threads to impart movement to said thrust rod, and operating means carried by said seat frame and connected to said gear driven screw nut to cause movement thereof.

5. A reclining seat comprising in combination, a supporting structure, a seat base carried by said supporting structure, a seat frame having a cushion receiving portion, independent upwardly diverging links pivotally connected at their upper ends to said seat frame and at their lower ends to said seat base at fixed points thereon and supporting the front and rear sides of said frame upon said base for reclining movement of the frame, a shaft rotatably carried by said seat frame, sets of gearing including a gear carried adjacent each end of said shaft, thrust rods connected to the links supporting the front side of said frame, said thrust rods having threaded engagement with the adjacent gearing and operable thereby to change the angular position of the front links whereby the reclining movements of said seat frame are controlled.

WILLIAM E. MOREY.
RALPH G. NICHOLS.